March 13, 1951     M. L. NELSON     2,544,895
SYSTEM AND APPARATUS FOR CONTROLLING AND
COUNTING THE OUTPUT OF SCREW MACHINES
Filed June 18, 1947
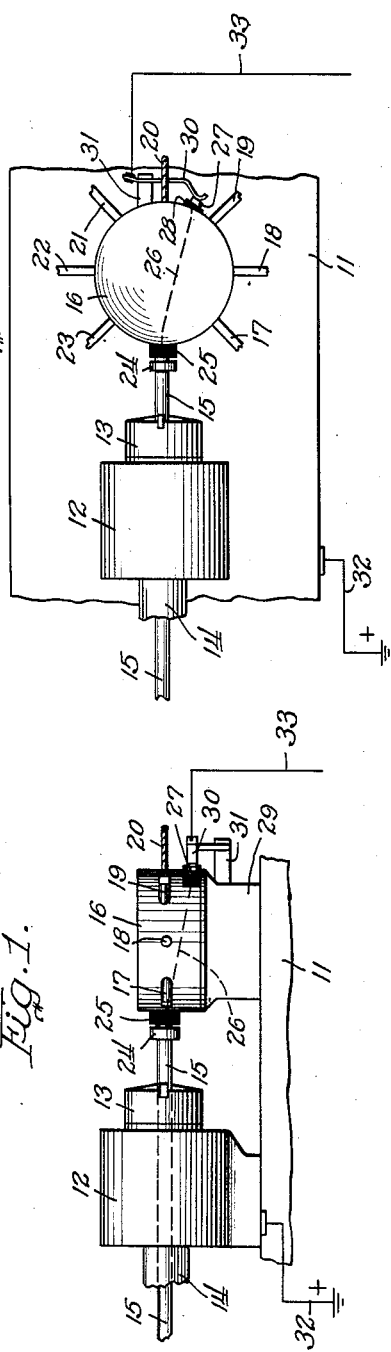
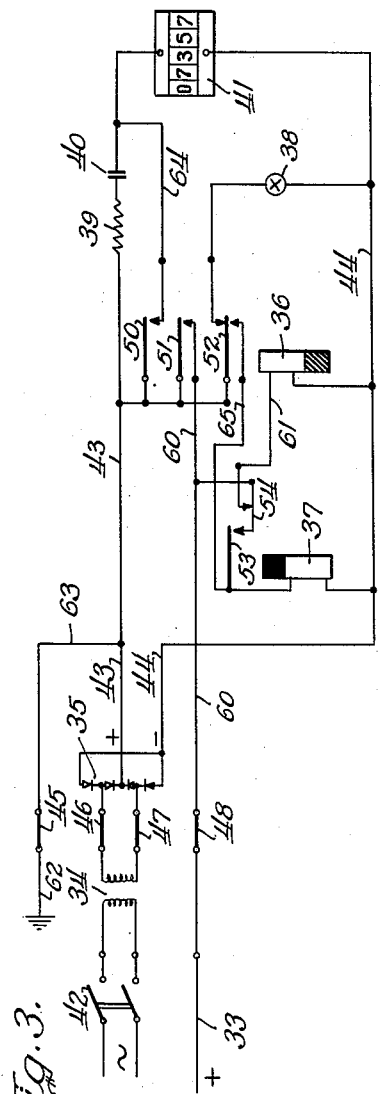
Inventor:
Martin L. Nelson.
By
his Attorney Patented Mar. 13, 1951

2,544,895

UNITED STATES PATENT OFFICE 2,544,895

SYSTEM AND APPARATUS FOR CONTROLLING AND COUNTING THE OUTPUT OF SCREW MACHINES

Martin L. Nelson, Park Ridge, Ill., assignor to Production Instrument Company, Chicago, Ill., a corporation of Illinois Application June 18, 1947, Serial No. 755,524

3 Claims. (Cl. 235—92)

1

This invention is concerned with a system and apparatus for controlling and counting the output of machine tools, such as screw machines or the like.

The object of the invention is to count each piece produced by a screw machine by creating an electrical impulse when the stock is in predetermined position relative to the tool holder or turret.

The foregoing object and additional objects and features will be brought out in the detailed description of an embodiment, which is rendered below with reference to the accompanying drawings. In these drawings, Fig. 1 is a diagrammatic elevational view of essential parts of a screw machine as seen from the front thereof;

Fig. 2 represents a top view of the screw machine parts indicated in Fig. 1; and Fig. 3 shows, in diagrammatic representation, control, signalling, indicating and recording means of the system and circuits therefor.

Like parts are numbered alike throughout the drawings. Known elements and details will be referred to only to the extent required for conveying an understanding of the invention.

Figs. 1 and 2 show in a greatly simplified diagrammatic representation only some of the essential parts of a screw machine which must be referred to in describing the invention. Numeral 11 indicates a portion of the bed; 12 is the tail stock or spindle head; 13 indicates the chuck which is rotatably mounted in the spindle head; 14 represents a feed guide tube which extends axially from the spindle head. The stock from which the predetermined parts are to be made may be a rod, as indicated at 15. Numeral 16 indicates the turret carrying tools 17—23 and a member forming the stop 24 which constitutes a contact device.

The stop 24 may be a metallic member having a shank which extends in sliding relation into a boring provided in the insulating member 25. The latter is suitably secured on the turret. The free end of the stop is a flangelike enlargement projecting from the insulating member. The stop is normally suitably resiliently biased in outward direction, e. g., by a spring. At the base or bottom of the boring in the insulating member 25 is provided a resilient contact for engagement by the inner end of the shank of the stop when the stop is depressed into its terminal position by engagement with the free end of the stock. The contact within the insulating member 25 is suitably wired either interiorly or exteriorly of the turret 16, as indicated by dotted line 26, to establish connection with a contact 27 which is mounted in insulated relationship by means of an insulating member 28. The turret 16 is rotatable on the post 29, and the latter is movable axially of the bed so as to bring any of the tools 17—23 into proper work relationship with the stock 15. The stop 24 is initially in the position indicated in the drawings Figs. 1 and 2. The stock 15 is advanced from left to right, as seen in the drawings, engages the stop 24 and presses against it to move it axially inwardly within the insulating member 25, thereby causing the inner end thereof to actuate the contact disposed in the insulating member 25, thus creating an electrical impulse. The terminal position of the stock and of the stop member is reached when the flangelike enlargement 24 engages the annular forward end of the insulating member 25. This operation determines the proper length of the stock. The contact 27 is at such time engaged by the wiper 30 which is mounted on a bracket 31. The latter is suitably secured on the post 29. The stock 15 is grounded in any suitable and approved manner, for example, through the spindle head 12 and the bed of the machine, as indicated at 32. Accordingly, ground potential is picked up from the stock 15 and is conducted through the wiring 26 and contact 27, to the wiper 30, thus creating the electrical impulse for transmission over the conductor 33 to the control, signalling, recording and counting equipment shown in Fig. 3.

The operation of such screw machines from the moment when the stock 15 is advanced to terminal work position in engagement with the stop 24 is well known, but for the sake of convenience it may be in broad terms briefly summarized. The turret is retracted axially and is rotated to bring the first tool into proper position with respect to the stock 15. The tool is then advanced, as required, with respect to the stock 15, and upon completion of the first operation the turret again is shifted with respect to the stock and is rotated so as to bring the second tool into proper operating position. All subsequently required tools are put in position in a similar manner, until the desired part is properly completed, whereupon it is cut off by a special tool which may be mounted on a suitable crossslide (not shown). The turret then moves again into initial position, with the stop 24 facing the chuck, and the stock 15 is again advanced to work position in engagement with the stop 24, whereupon the operations are repeated. In a fully automatic screw machine all these operations are automatically controlled. Semi-automatic control may be provided for, leaving the positioning of the turret to an operator. The ground potential is transmitted from the stock by way of the stop 24 to the control equipment, over conductor 33, as described, only at the time when the stop 24 is engaged by the stock 15, i. e., only in the initial position of the turret, as shown in Figs. 1 and 2.

It is desirable, in automatic and also in semi-automatic operation, to count the number of parts produced. Stroke counters have been proposed in connection with certain types of machine tools, punch presses and the like, in which a suitable arm is associated with a movable part, e. g., with the plunger of a punch press, adapted to engage upon each stroke a lever which is associated with a suitable counter. Such stroke counters do not furnish reliable supervision and control in connection with screw machines, because obviously the counter would be operated during the idling of the machine and would thus furnish a false count. In semi-automatic screw machine operation such false count could be produced by the idle shifting of the turret by the operator, and in fully automatic screw machines, the operation continues for some time after the stock has been exhausted, until the attendant becomes aware of the idling and stops the machine temporarily to supply new stock. All idling strokes would then be counted as production strokes.

Such false counting is prevented by the system disclosed herein because the actual presence of stock and each advance thereof into work position is used as a criterion for effecting a count.

The control and counting equipment is disposed within a suitable housing (not shown) and comprises a number of simple parts, including a step-down transformer 34, a rectifier, e. g., a selenium rectifier 35, a pair of relays 36 and 37, a signal lamp 38, a resistor 39 in series with the condenser 40, and an electrical counter indicated at 41. Numeral 42 indicates a switch adapted to connect the equipment with a suitable source of current, for example, a commercial alternating current source.

The transformer 34 reduces the line voltage to 20 volts. The rectifier furnishes across the output leads 43—44 direct current of 18 volts. Numerals 45—48 are jack and plug members to establish connection between the various terminals. The initial line voltage may, of course, vary and the step-down transformer 34 must be correspondingly designed to produce at the terminals of its secondary winding the desired voltage. Different types of rectifiers 35 may be used, and the direct current output from the rectifier may be 18 volts, as specified, or the voltage may be different. These values are variables, as will be well understood.

The relays 36—37 are of the type well known and commonly used in a great variety of signalling equipment, including telephone switching devices. The relay 36 is slow to release and the relay 37 is slow to energize and slow to release. The relay 36 carries two make contacts 50—51 and a break-make contact 52. The relay 37 carries a make contact 53 and a break contact 54. The counter 41 may be of the type disclosed, for example, in Patent No. 2,514,788, dated July 11, 1950. The conductor 33 from the screw machine is wired to the control equipment shown in Fig. 3 in any suitable and approved manner.

The operation of the control and counting equipment is as follows:

The switch 42, after being put in actuated position, connects alternating current to the primary winding of the transformer 34. The voltage is stepped down, as previously mentioned, and is conducted to the rectifier 35, the output of which is 18 volts D. C. appearing on the conductors 43—44. An inspection of the circuit will show that the signal lamp 38 is connected across the conductors 43—44 by way of the break contact associated with the contact spring 52. The signal lamp is therefore normally lighted, indicating that the apparatus is in operating condition. The screw machine operates and, whenever stock 15 is advanced to terminal work position in engagement with the stop 24, a ground impulse is connected to the wire 33 and transmitted to the control equipment, Fig. 3, over the plug and jack contact 48 to the left hand branch of conductor 60. The circuit of this conductor is open at the make contact 51, but is closed at the break contact associated with contact spring 54, and the ground impulse on conductor 33 is thus transmitted over the conductor 60, normally closed break contact 54 of relay 37, conductor 61 to the winding of relay 36, the other terminal of which is connected to conductor 44 which is the negative output lead of the rectifier 35. The positive output lead 43 is grounded at 62 over the plug and jack contact 45 and conductor 63. Relay 36 therefore energizes and actuates its contact springs 50—52.

At contact spring 50 a circuit is closed upon energization of relay 36, which may be traced from ground on conductor 43, closed contact 50, conductor 64 to one terminal of the counter 41, the other terminal of which is connected to the negative conductor 44. The counter 41 now operates and registers one count. The resistor 39 and condenser 40 are connected in parallel with the circuit closed by contact spring 50 to suppress sparking. At contact spring 51 ground on conductor 43 is connected to the conductor 60 in parallel with the ground transmitted to this conductor over conductor 33 from the stop contact of the screw machine. This is done in order to assure the energization of relay 36, because in rapid operation of the screw machine a slight chattering may result at the moment when the stock 15 engages the stop 24, and an instant later the turret is shifted into its first operating position, disconnecting ground from conductors 33 and 60. Such chattering may also be produced if the free end of the stock 15 is not in perfect angular alignment with the transverse plane of the stop 24, and false counts might be produced. This is avoided by the actuation of contact spring 51, as described, assuring a full impulse for the energization of relay 36 regardless of the distinctiveness or lack of distinctiveness of the ground impulse transmitted from the machine tool over conductor 33.

Relay 36 is now in energized position and is held energized in a circuit from negative potential on conductor 44, winding of relay 36, conductor 61, over the break contact 54 of relay 37, conductor 60, and its own make contact spring 51 to ground on conductor 43 independent of the ground conditions on the conductor 33. At contact spring 52 relay 36 disconnecting ground from conductor 43 to break the circuit to the signal lamp 38, at the same time connecting ground from conductor 43 to close a circuit including conductor 65 to the winding of relay 37, the other terminal of which is connected to the conductor 44 carrying negative potential. Relay 37 energizes with some delay of a few milliseconds. This delay further assures full operation of relay 36 by delaying the opening of its energizing circuit at contact spring 54. Upon energizing, relay 37 actuates its contact spring 53 into engagement with the contact spring 54, thus opening contact 54 and thereby also opening the circuit to the winding of relay 36 over conductor 61. Relay 36 begins to deenergize and will deenergize after the lapse of a few milliseconds, as determined by its operating characteristics. The delayed deenergization of relay 36 assures a full impulse for the counter 41 and a full impulse for the energization of relay 37. Relay 37 locks itself to ground on conductor 43 over its contacts 53 and 54 which are now in engagement, conductor 60, and thence over contact 51 of relay 36 which is still in operated position. Relay 36 finally deenergizes and restores its contact springs 50—52 to normal, as shown in Fig. 3. At contact spring 50 ground is disconnected from the counter 41. At contact 51 ground is disconnected from the conductor 60, and at contact 52 ground is disconnected from conductor 65 over which relay 37 was initially energized and is re-connected to the lamp 38.

The turret of the screw machine is at this time either in one of its operating positions, with a corresponding tool in working engagement with the stock 15, or in one of its transfer positions, moving a tool into operating position. There is no ground on the stop 24 in either case, and ground is accordingly disconnected from conductor 33 and therefore from the left hand branch of conductor 60 of the control circuit. It will be recalled that upon opening contact 51, responsive to deenergization of relay 36, ground from conductor 43 is also removed from the right hand branch of conductor 60, and the circuit of relay 37 is therefore interrupted. Relay 37 deenergizes and restores its contact springs 53—54 to normal position. The circuits are again at normal, as shown, signal lamp 38 being lighted over its circuit including contact spring 52 in normal position as shown in the drawing.

The interplay and coaction of relays 36—37, as described, assures a full count and prevents false counts even under severe operating conditions. The counter 41 operates extremely rapidly, its operation being in fact so quick that it can be detected only by observing the advance of the number wheels. The intermittent actuation of the signal lamp 38 furnishes an assurance for the operating personnel that each piece produced by the screw machine is actually counted.

A predetermined counter, for example, of the type disclosed in Patent No. 2,346,869, dated April 19, 1944, or of the type referred to in copending application Ser. No. 666,582, filed May 2, 1946, suitably modified for the present purpose, may be substituted for the counter 41, or may be provided in addition thereto and connected in parallel therewith.

Additional safeguards, signalling and control features, such as are apparent from the above mentioned Patent 2,346,869 and also from the copending application Ser. No. 666,582 may be included when such a predetermined counter is employed.

The system and apparatus disclosed herein may be used in connection with automatic, semiautomatic or manually controlled screw machines of the single spindle type, as described, and also with multiple spindle screw and index machines and other machine tools.

The stop 24—25 may be formed as described or may be modified as desired.

For example, the head of the stop, i. e., its flange-like enlargement, may be split and the forward portion thereof may be rotatable on a ball bearing. It will rotate with the stock and thus preserve its proper shape by avoiding the grinding of the end of the rotating stock on its surface.

A contact may be provided within the stop or within its insulating mounting member comprising two contact springs which are normally open and are closed when the stop moves into its terminal position to create the electrical impulse independent of a potential on the stock. Such structure will operate regardless of the nature of the material of the stock, e. g., when it is desired to produce pieces from an insulating material.

The contact means associated with the stop, either as shown or as indicated in the foregoing paragraph, may also be provided in whole or in part on the outside of the stop or its mounting member, depending on the particular machine tool which is to be equipped with the control and counting apparatus.

Further modifications may be made by associating the impulse contact means with the cutoff tool or with the cross-slide carrying such cutoff tool instead of with the stop as shown. A suitable pivotally mounted lever arm may be provided in such case, forming part of a small switch, mounted either on the cutoff tool or on the cross-slide and carrying a roller or a pair of rollers for engagement with the finished piece incident to the cutoff operation of the tool. The lever arm actuates contact means incident to its angular displacement caused by engagement with the piece which is being severed from the stock to create an impulse which is then transmitted to the control equipment just like the impulse created by the actuation of the stop as described with reference to the drawing. The operation of the control equipment remains the same. The only difference is that the count is effected upon completion of the workpiece instead of at the beginning of the work operations.

It will be understood, in view of the foregoing explanations, that changes may be made within the scope and spirit of the appended claims.

I claim:

1. In combination with a machine tool having a tool holder adapted to be selectively positioned with respect to stock advanced into work position relative thereto, means for placing a potential on said stock, a contact device carried by said tool holder, said contact device including a movable stop member for resilient engagement with said stock in predetermined initial position of said tool holder, contact means operatively actuated by said movable stop responsive to engagement thereof by said stock, a pickup contact device connected with said contact means for receiving an electrical impulse therefrom responsive to operative actuation thereof by said movable stop when said stop is engaged by said stock, an impulse conductor extending from said pickup contact device, control circuit means connected with said impulse conductor to receive successive electrical impulses therefrom, said control circuit means comprising a first slow-to-release relay, a counter, means for transmitting said impulses delivered by said impulse conductor to said first relay, means controlled by said first relay for actuating said counter responsive to each impulse received by said first relay, a second slow-to-energize and slow-to-release relay, means controlled by said first relay for energizing said second relay, and means controlled by said second relay for releasing said first relay.

2. In combination with a machine tool having a tool holder adapted to be selectively positioned with respect to stock advanced into work position relative thereto, means for placing a potential on said stock, a contact device carried by said tool holder, said contact device including a movable stop member for resilient engagement with said stock in predetermined initial position of said tool holder, contact means operatively actuated by said movable stop responsive to engagement thereof by said stock, a pickup contact device connected with said contact means for receiving an electrical impulse therefrom responsive to operative actuation thereof by said movable stop when said stop is engaged by said stock, an impulse conductor extending from said pickup contact device, control circuit means connected with said impulse conductor to receive successive electrical impulses therefrom, said control circuit means comprising the following essential elements, namely, (1) a control circuit; (2) a counter; (3) a first slow-to-release relay for receiving said impulses delivered over said impulse conductor; (4) means controlled by said first relay for actuating said counter to record each impulse; (5) a second slow-to-energize and slow-to-release relay; (6) circuit means controlled by said first relay and forming part of said control circuit and being independent of but connected with said impulse conductor which delivers said impulse for energizing said second relay; and (7) circuit means controlled by said second relay for releasing said first relay.

3. In combination with a machine tool having a tool holder adapted to be selectively positioned with respect to stock advanced into work position relative thereto, said stock being rotated in said work position, means for placing a potential on said stock, a contact device carried by said tool holder, said contact device including a movable stop member for resilient engagement with said stock in predetermined initial position of said tool holder, part of said movable stop being rotatable with said stock, contact means operatively actuated by said movable stop responsive to engagement thereof by said stock, a pickup contact device connected with said contact means for receiving an electrical impulse therefrom responsive to operative actuation thereof by said movable stop when said stop is engaged by said stock, an impulse conductor extending from said pickup contact device, control circuit means connected with said impulse conductor to receive successive electrical impulses therefrom, said control circuit means comprising the following essential elements, namely, (1) a control circuit; (2) a counter; (3) a first slow-to-release relay for receiving said impulses delivered over said impulse conductor; (4) means controlled by said first relay for actuating said counter to record each impulse; (5) a second slow-to-energize and slow-to-release relay; (6) circuit means controlled by said first relay and forming part of said control circuit and being independent of but connected with said impulse conductor which delivers said impulse for energizing said second relay; and (7) circuit means controlled by said second relay for releasing said first relay.

MARTIN L. NELSON.

REFERENCES CITED

The following references are of record in the file of this patent:

UNITED STATES PATENTS

| Number | Name | Date |
|---|---|---|
| 1,875,026 | Kunkelman et al. | Aug. 30, 1932 |
| 2,048,192 | Marston | July 21, 1936 |
| 2,318,372 | Caldwell | May 4, 1943 |
| 2,425,124 | Ray | Aug. 5, 1947 |